United States Patent
Koyama

[19]

[11] Patent Number: 5,990,951
[45] Date of Patent: Nov. 23, 1999

[54] SOLID-STATE IMAGING DEVICE AND METHOD FOR DRIVING THE SAME

[75] Inventor: Eiji Koyama, Nara, Japan

[73] Assignee: Sharp Kabushiki Kaisha, Osaka, Japan

[21] Appl. No.: 08/904,283

[22] Filed: Jul. 31, 1997

[30] Foreign Application Priority Data

Oct. 9, 1996 [JP] Japan .................................. 8-268937

[51] Int. Cl.⁶ .................................................. H04N 3/14
[52] U.S. Cl. .......................... 348/302; 348/294; 348/300; 348/301; 330/133; 330/297
[58] Field of Search .................... 348/294, 300, 348/301, 302, 303, 311; 257/239; 330/297, 133, 308; 377/60

[56] References Cited

U.S. PATENT DOCUMENTS

| | | | |
|---|---|---|---|
| 5,220,587 | 6/1993 | Takemoto et al. | 377/60 |
| 5,457,433 | 10/1995 | Westwick | 330/264 |
| 5,471,246 | 11/1995 | Nishima et al. | 348/311 |
| 5,552,751 | 9/1996 | Cooper | 331/158 |
| 5,600,451 | 2/1997 | Maki | 358/483 |
| 5,751,639 | 5/1998 | Ohsawa | 365/226 |
| 5,757,225 | 5/1998 | Tobita | 327/539 |
| 5,767,902 | 6/1998 | Koyama | 348/311 |
| 5,818,075 | 10/1998 | Kawamoto et al. | 257/239 |
| 5,892,390 | 4/1999 | Tobita | 327/543 |

OTHER PUBLICATIONS

H. Asada et al., "Signal Amplifier Circuit", Japanese Laid-Open Publication No. 03274811 A, Published on Dec. 5, 1991.

S. Toyama, "Back–Surface Type Solid–State Infrared Image Sensor", Japanese Laid–Open Publication No. 05251677 A, Published on Sep. 28, 1993.

M. Asaumi, "Solid State Image Pickup Device", Japanese Laid–Open Publication No. 06070239 A, Published on Mar. 11, 1994.

*Primary Examiner*—Wendy Garber
*Assistant Examiner*—Mitchell White
*Attorney, Agent, or Firm*—Dike, Bronstein, Roberts & Cushman, LLP; David G. Conlin; William J. Daley, Jr.

[57] ABSTRACT

A solid-state imaging device of the present invention includes: a plurality of photoelectric conversion elements; a transfer section for transferring charges generated by the photoelectric conversion elements; a floating diode for converting the charges transferred by the transfer section to voltage signals; and an amplification section including a plurality of source follower circuits, each amplifying the voltage signals generated by the floating diode, wherein different power supply voltages are supplied to the respective source follower circuits, and the power supply voltages are reduced as the DC current flowing through each of the respective source follower circuits increases.

9 Claims, 5 Drawing Sheets

SOLID-STATE IMAGING DEVICE AND METHOD FOR DRIVING THE SAME

BACKGROUND OF THE INVENTION

1. Field of the Invention

The present invention relates to a solid-state imaging device which is applicable to camera systems such as video cameras, monitor cameras, door checker cameras, on-vehicle cameras, cameras for TV telephone and cameras for multimedia, and a method for driving the same. In particular, the present invention relates to a solid-state imaging device which contributes to the reduction of voltage and power consumption of a camera system, and a method for driving the same.

2. Description of the Related Art

FIG. 4 shows the structure of a conventional solid-state imaging device. As shown in FIG. 4, the solid-state imaging device includes a plurality of photoelectric conversion elements 110 arranged in a matrix, a plurality of vertical transfer sections 130, and a horizontal transfer section 140. The photoelectric conversion elements 110 act as light receiving elements. Each of the vertical transfer sections 130 is composed of a charge-coupled device (hereinafter, referred to as CCD) disposed along a column of the photoelectric conversion elements 110. The horizontal transfer section 140 is disposed at the bottom ends of the vertical transfer sections 130.

Signal charges stored in the photoelectric conversion elements 110 are transferred to the vertical transfer sections 130 once every field period. The vertical transfer sections 130 then sequentially transfer the injected signal charges in a vertical direction (i.e., in a direction in which the vertical transfer sections 130 elongate) before the start of the next field period. The horizontal transfer section 140 receives the signal charges output sequentially from the vertical transfer sections 130 and transfers the signal charges horizontally in series.

The signal charges transferred from the horizontal transfer section 140 are output as signal outputs by a signal output circuit. FIG. 5 schematically shows the configuration of the conventional signal output circuit.

The signal output circuit shown in FIG. 5 includes a reset circuit 1, a floating diode 2, and an amplification circuit 3. The reset circuit 1 applies a reset voltage Vr of about 15 V to the floating diode 2 prior to the detection of charges, so that a terminal voltage of the floating diode 2 is set at the reset voltage Vr. Thereafter, the charges transferred from the horizontal transfer section 140 are accumulated in the floating diode 2. As a result, the terminal voltage of the floating diode 2 changes. The amplification circuit 3 receives the terminal voltage of the floating diode 2, and outputs a signal in accordance with the change in voltage. Thereafter, the reset circuit 1 reapplies the reset voltage Vr to the floating diode 2, so that the charges transferred from the horizontal transfer section 140 are transferred to the floating diode 2 again.

The floating diode 2 includes a semiconductor substrate and a diffusion layer N+ which is in a potentially floating state formed on the semiconductor substrate. The diffusion layer N+ and a P-well of the semiconductor layer formes a PN junction, thereby forming a diode. The diode also serves as a capacitor.

A change in voltage Vq of the floating diode 2 is expressed by the following Expression 1:

$$Vq=Q/C \qquad \text{[Expression 1]}$$

where C is a capacitance of the floating diode 2, and Q is the amount of charges transferred from the horizontal transfer section 140 to the floating diode 2.

Since the floating diode 2 has a remarkably high output impedance, it is not possible to output signals. Therefore, in order to lower the output impedance, a plurality of source follower circuits 4 and 5 are provided in parallel for the amplification circuit 3. A signal corresponding to a change in voltage Vq is output through the source follower circuits 4 and 5.

A constant current source 8 is connected to a source of a transistor 6 of the source follower circuit 4, while a constant current source 9 is connected to a source of a transistor 7 of the source follower circuit 5. Each of the constant current sources 8 and 9 is constituted by a transistor.

The reason that a plurality of source follower circuits are provided in parallel is as follows.

First, an output impedance $R_{out}$ of the source follower circuit is expressed by Expression 2 below:

$$R_{out} \propto [(W/L) \times I]^{-\frac{1}{2}} \qquad \text{[Expression 2]}$$

where W is a gate width of a transistor of the source follower circuit, L is a gate length thereof, and I is a current flowing from the drain to the source.

As is apparent from Expression 2, the output impedance $R_{out}$ of the source follower circuit can be lowered by increasing a value of $(W/L) \times I$.

However, if the gate width W is increased, the capacitance C of the floating diode 2 in Expression 1 above is accordingly increased. Since a change in voltage Vq is reduced thereby, increasing the gate width W is not desirable for lowering the output impedance of the source follower circuit. In fact, the gate width W should be made as small as possible so that the transistor does not suffer from the effects of noise or the like.

In order to lower the output impedance $R_{out}$, it may be possible to reduce the gate length L or increase the current I. However, the reduction of the gate length L or the increase of the current I is limited by noise effects.

Even if the source follower circuit is employed, it is not possible to sufficiently reduce the output impedance $R_{out}$ with a single source follower circuit. Therefore, a plurality of source follower circuits are provided in parallel, so the output impedance is gradually reduced by passing the input signal through the plurality of source follower circuits.

Specifically, a plurality of source follower circuits are designed so that the value of $(W/L) \times I$ increases by passing the input signal through the source follower circuits to reduce the output impedance. In accordance with such a configuration, the last source follower circuit requires a current of 3 to 4 mA or more.

For example, Japanese Laid-Open Publication Nos. 3-274811, 5-251677, and 6-70239 disclose such a solid-state imaging device employing a plurality of source follower circuits.

In the case where the plurality of source follower circuits 4 and 5 are employed, it is preferred to set a power supply voltage at a high level. The reason for this is as follows. A DC current voltage level is lowered as it flows from the input to the output of the source follower circuit. If the current voltage drops below a certain voltage (that is, the lower limit voltage below which the constant current sources 8 and 9 constituted by transistors do not operate), the source follower circuits 4 and 5 do not operate. The range of the DC voltage level allowing the source follower circuits to operate is increased at a higher power supply voltage. Therefore, setting a power supply voltage at a high level is advantageous in terms of dynamic range.

In order to preserve such a high power supply voltage Vod1, a relatively high reset voltage Vr, that is, 15 V on the floating diode 2 as described above, is used. As a result of this, the system can be simplified.

However, in the case where the power supply voltage Vod1 is set at a high value, the power consumption is disadvantageously increased because the current passing through the source follower circuits is increased in order to lower the output impedance $R_{out}$ of the source follower circuits.

SUMMARY OF THE INVENTION

A solid-state imaging device of the present invention includes: a plurality of photoelectric conversion elements; a transfer section for transferring charges generated by the photoelectric conversion elements; a floating diode for converting the charges transferred by the transfer section to voltage signals; and an amplification section including a plurality of source follower circuits, each amplifying the voltage signals generated by the floating diode, wherein different power supply voltages are supplied to the respective source follower circuits, and the power supply voltages are reduced as a DC current flowing through each of the respective source follower circuits increases.

In one embodiment of the invention, transistors, each constituting one of the source follower circuits, have respectively different thresholds, and the threshold of the transistors of the source follower circuits are increased as the DC current flowing through each of the source follower circuits increases.

According to another aspect of the invention, a solid-state imaging device includes: a plurality of photoelectric conversion elements arranged in a matrix; a transfer section for transferring charges generated by the photoelectric conversion elements; a floating diode for converting the charges transferred by the transfer section to voltage signals; and an amplification section for amplifying the voltage signals, including a first source follower circuit through which a first current flows and a second source follower circuit through which a second current flows, the second current having a value higher than a value of the first current, wherein a first voltage for operating the first source follower circuit is applied to the first source follower circuit, and a second voltage for operating the second source follower circuit is applied to the second source follower circuit, and wherein the second voltage is set lower than the first voltage.

In one embodiment of the invention, the first source follower circuit is formed by a first transistor, and the second source follower circuit is formed by a second transistor, and a threshold of the second transistor is higher than that of the first transistor.

In another embodiment of the invention, the amplification section further includes a third source follower circuit through which a third current flows, the third current being higher than the second current flowing through the second source follower circuit, and a voltage for allowing the third source follower circuit to operate, which is applied to the third source follower circuit, and is set lower than the second voltage applied to the second source follower circuit.

In still another embodiment of the invention, the first source follower circuit is formed by a first transistor, the second source follower circuit is formed by a second transistor, and the third source follower circuit is formed by a third transistor, and wherein a threshold of the third transistor is higher than that of the second transistor, and a threshold of the second transistor is higher than that of the first transistor.

In still another embodiment of the invention, the second voltage applied to the second source follower circuit is lower than 15 V.

According to still another aspect of the invention, a method for driving a solid-state imaging device including: a plurality of photoelectric conversion elements arranged in a matrix; a transfer section for transferring charges generated by the photoelectric conversion elements; a floating diode for converting the charges transferred by the transfer section to voltage signals; and an amplification section for amplifying the voltage signals, including a first source follower circuit through which a first current flows and a second source follower circuit through which a second current flows, the second current having a value higher than a value of the first current, the method includes the steps of: applying a first voltage to the first source follower circuit for allowing the first source follower circuit to operate, and applying a second voltage to the second source follower circuit for operating the second source follower circuit, wherein the second voltage is set so as to be lower than the first voltage.

In one embodiment of the invention, the second voltage applied to the second source follower circuit is lower than 15 V.

Thus, the invention described herein makes possible the advantages of: (1) providing a solid-state imaging device employing a plurality of source follower circuits while restraining the power consumption; and (2) providing a method for driving such a solid-state imaging device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described with reference to the drawings.

EXAMPLE 1

Figure 1:
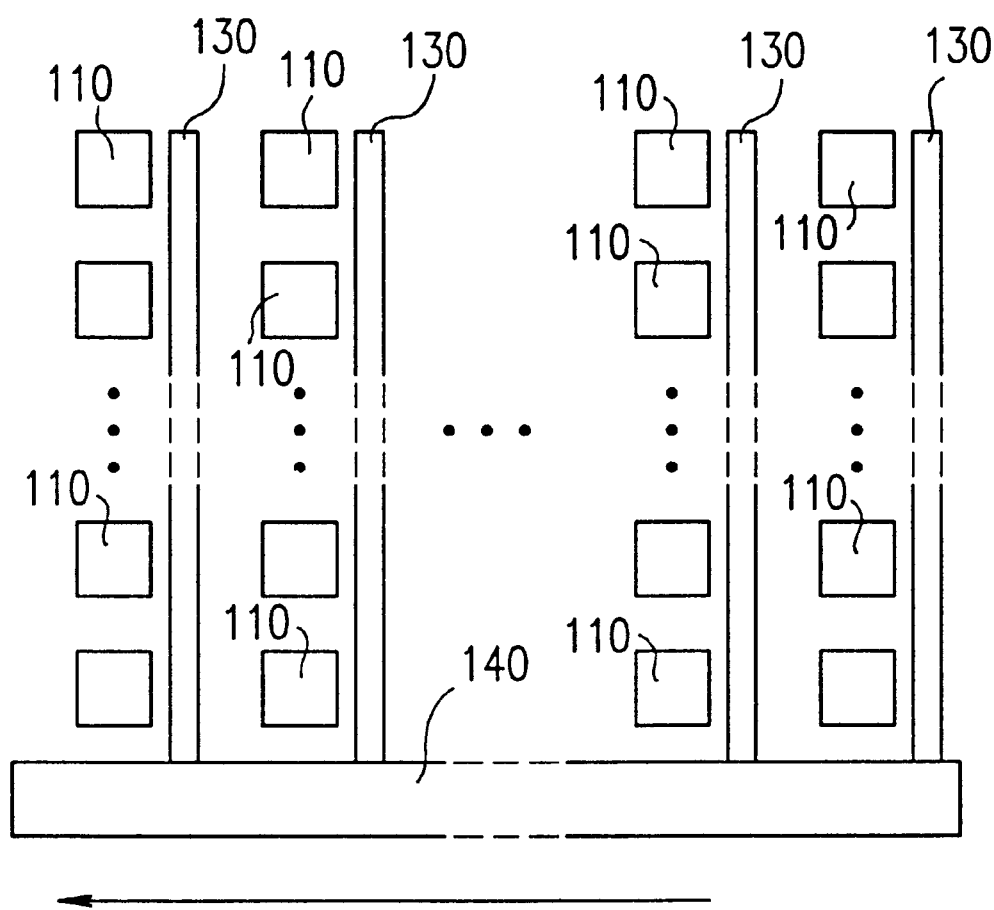
FIG. 1 is a block diagram of a CCD solid-state imaging device used in a first example according to the present invention.

FIG. 1 shows the structure of a CCD solid-state imaging device of Example 1. As shown in FIG. 1, the CCD solid-state imaging device includes a plurality of photoelectric conversion elements 110 arranged in a matrix, a plurality of vertical transfer sections 130, and a horizontal transfer section 140. The photoelectric conversion elements 110 act as light receiving elements. Each of the vertical transfer sections 130 is composed of a CCD disposed along a column of the photoelectric conversion elements 110. The horizontal transfer section 140 is disposed at the bottom ends of the vertical transfer sections 130.

Signal charges stored in the photoelectric conversion elements 110 are transferred to the vertical transfer sections 130 once every field period. The vertical transfer sections 130 then sequentially transfer the injected signal charges in a vertical direction (i.e., in a direction in which the vertical transfer sections 130 elongate) before the start of the next field period. The horizontal transfer section 140 receives the signal charges output sequentially from the vertical transfer sections 130 and transfers the signal charges horizontally in series.

Figure 2:
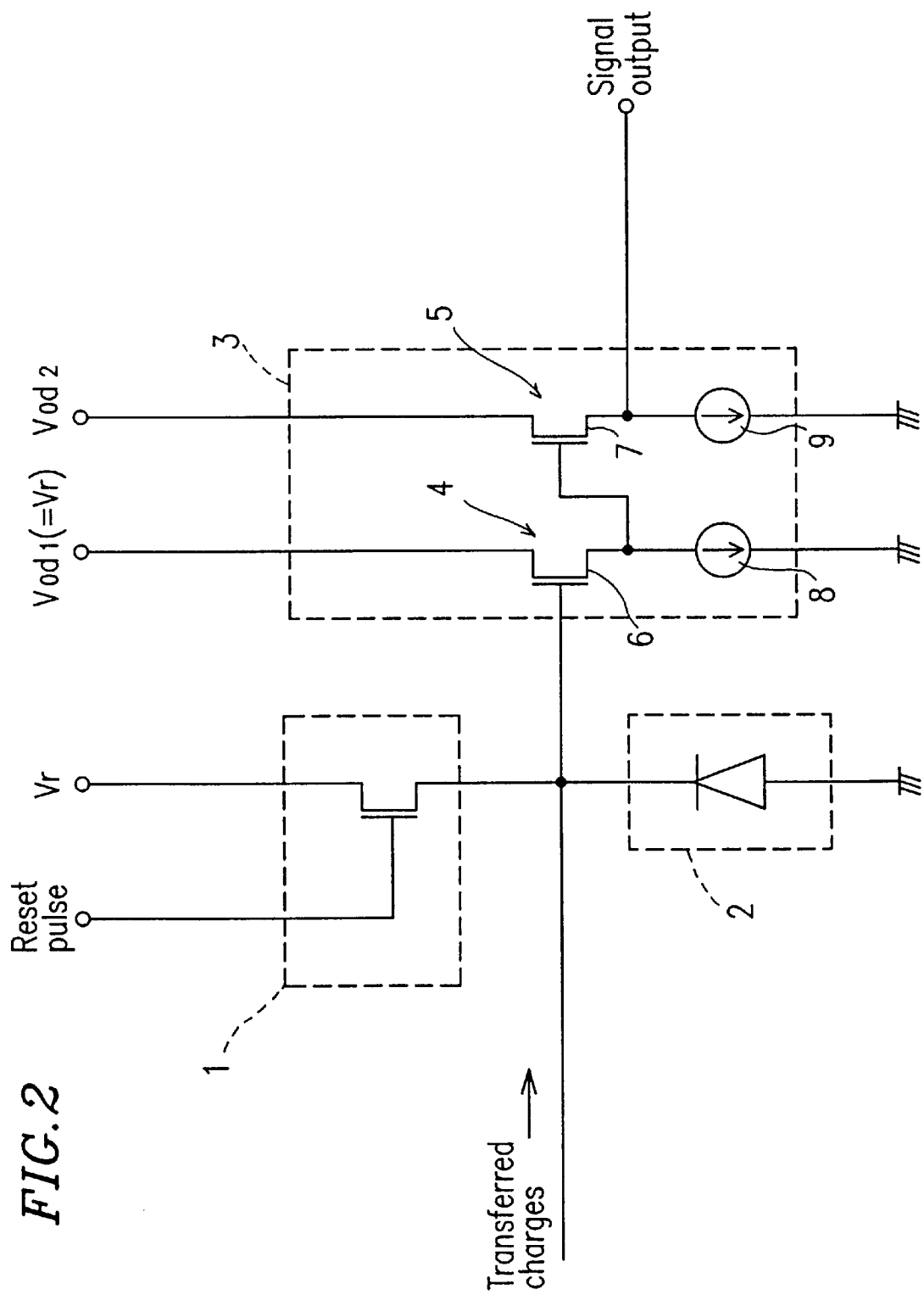
FIG. 2 is a circuit diagram showing a signal output circuit of the CCD solid-state imaging device in the first example according to the present invention.

The CCD solid-state imaging device of Example 1 includes a signal output circuit for outputting a signal charge transferred from the horizontal transfer section 140 as a signal output as shown in FIG. 2. The signal output circuit shown in FIG. 2 is connected to the output section of the horizontal transfer section 140. The signal output circuit includes a reset circuit 1, a floating diode 2, and an amplification circuit 3. The amplification circuit 3 includes a first source follower circuit 4 and a second source follower circuit 5 provided in parallel.

The reset circuit 1 applies a reset voltage Vr of about 15 V to the floating diode 2 prior to the detection of charges, so that a terminal voltage of the floating diode 2 is set at the reset voltage Vr. Thereafter, the charges transferred from the horizontal transfer section 140 are accumulated in the floating diode 2. As a result, the terminal voltage of the floating diode 2 changes. The amplification circuit 3 receives the terminal voltage of the floating diode 2, and outputs a signal in accordance with the change in voltage. Thereafter, the reset circuit 1 reapplies the reset voltage Vr to the floating diode 2, so that the charges transferred from the horizontal transfer section 140 are transferred to the floating diode 2 again.

In Example 1, a power supply voltage Vod2 which is lower than the reset voltage Vr is used as the power supply voltage for the second source follower circuit 5 of the amplification circuit 3. In this regard, the signal output circuit of Example 1 differs from the conventional signal output circuit (see FIG. 5) using the reset voltage Vr of 15 V as the power supply voltage of the second source follower circuit 5.

However, the first source follower circuit 4 uses the reset voltage Vr of 15 V as the power supply voltage Vod1 as in the conventional signal output circuit. Since a current flowing through the first source follower circuit is small, i.e., about 200 to 300 μA, the remarkable reduction in power consumption cannot be expected even if the power supply voltage Vod1 of the source follower circuit 4 is lowered.

On the other hand, since a current of about 3 to 4 mA flows through the second source follower circuit 5, the power consumption which is obtained by multiplying the current and voltage can be reduced by lowering the power supply voltage Vod2 of the source follower circuit 5.

The power supply voltage Vod2 of the second source follower circuit 5 can be determined in the following manner.

First, in order to allow the second source follower circuit 5 to perform a normal operation, it is sufficient to allow a transistor 7 to operate within its current saturation range. The condition thereof is expressed by the following Expression 3:

$$(Vod2-Vos) \geq (Vg-Vos)-Vth2 \quad \text{[Expression 3]}$$

where Vos is the source voltage of the transistor 7, Vg is the gate voltage, and Vth2 is the threshold of the transistor 7.

When the source voltage Vos is deleted from Expression 3, the following Expression 4 is obtained.

$$Vod2 \geq Vg-Vth2 \quad \text{[Expression 4]}$$

Within the range determined by Expression 4, a saturated current is allowed to flow at any power supply voltage Vod2 of the second source follower circuit 5. If the power supply voltage Vod2 is minimized within the range determined by Expression 4, it is possible to restrain the power of the source follower circuit 5.

For example, assuming the gate voltage Vg is 10 V and the threshold value Vth2 is 1 V, the power supply voltage Vod2 equal to or larger than 9 V can be obtained based on Expression 4 above. Therefore, if the power supply voltage Vod2 is set at 9 V, it is possible to minimize the power consumption of the second source follower circuit 5 while maintaining the saturated current of the transistor 7.

Figure 5:
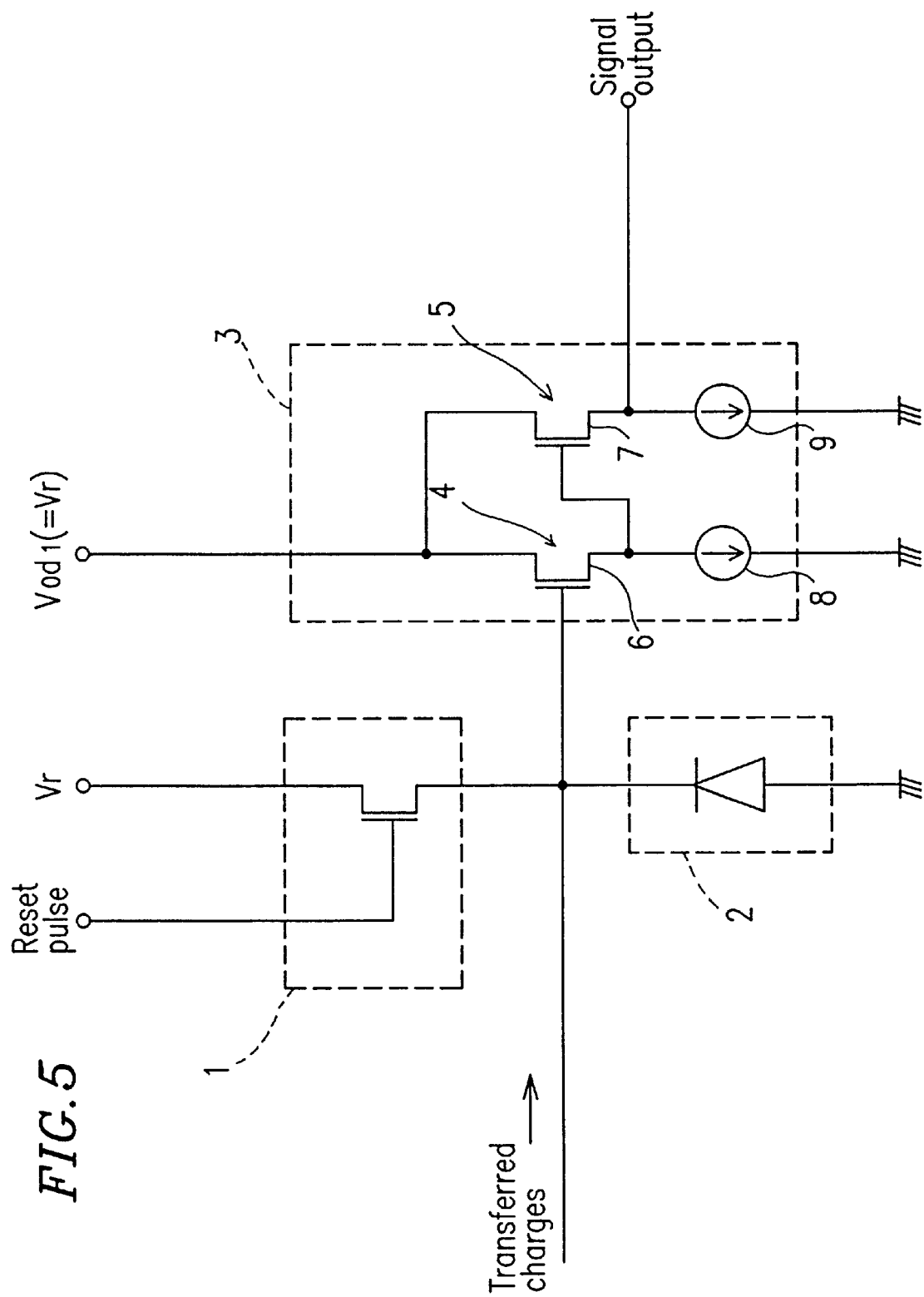
FIG. 5 is a circuit diagram showing a conventional signal output circuit of the conventional solid-state imaging device of FIG. 4.

If it is assumed that the current I flowing through the second source follower circuit 5 is 4 mA, the power consumption of the source follower circuit 5 is (9 V×4 mA), that is, 36 mW. On the other hand, in the conventional example as shown in FIG. 5, since the reset voltage Vr of 15 V is used as the power supply voltage of the source follower circuit 5, the power consumption is (15 V×4 mA), that is, 60 mW. As is apparent from the comparison of the power consumption, the power consumption in Example 1 is smaller than that of the conventional example. The difference in power consumption is 24 mW.

On the basis of Expression 4 above, it is possible to lower the power supply voltage Vod2 by increasing the threshold Vth2. Thus, it is also possible to reduce the power consumption by increasing the threshold Vth2.

For example, if the transistor 7 having a threshold Vth2 of 5 V is employed, the power supply voltage Vod2 equal to or larger than 5 V is obtained based on Expression 4 (in this case, the gate voltage Vg is equal to 10 V). If the current I flowing through the second source follower circuit 5 is set at 4 mA, the power consumption is further reduced to (5 V×4 mA), that is, 20 mW. Thus, a difference between the power consumption of Example 1 and the power consumption (60 mW) of the conventional example shown in FIG. 5 is 40 mW; the power consumption is reduced to about one-third of that of the conventional example.

Accordingly, if the power supply voltage Vod2 is reduced as small as possible and the threshold Vth2 of the transistor 7 is increased based on Expression 4 above, the power consumption is greatly reduced.

EXAMPLE 2

Figure 3:
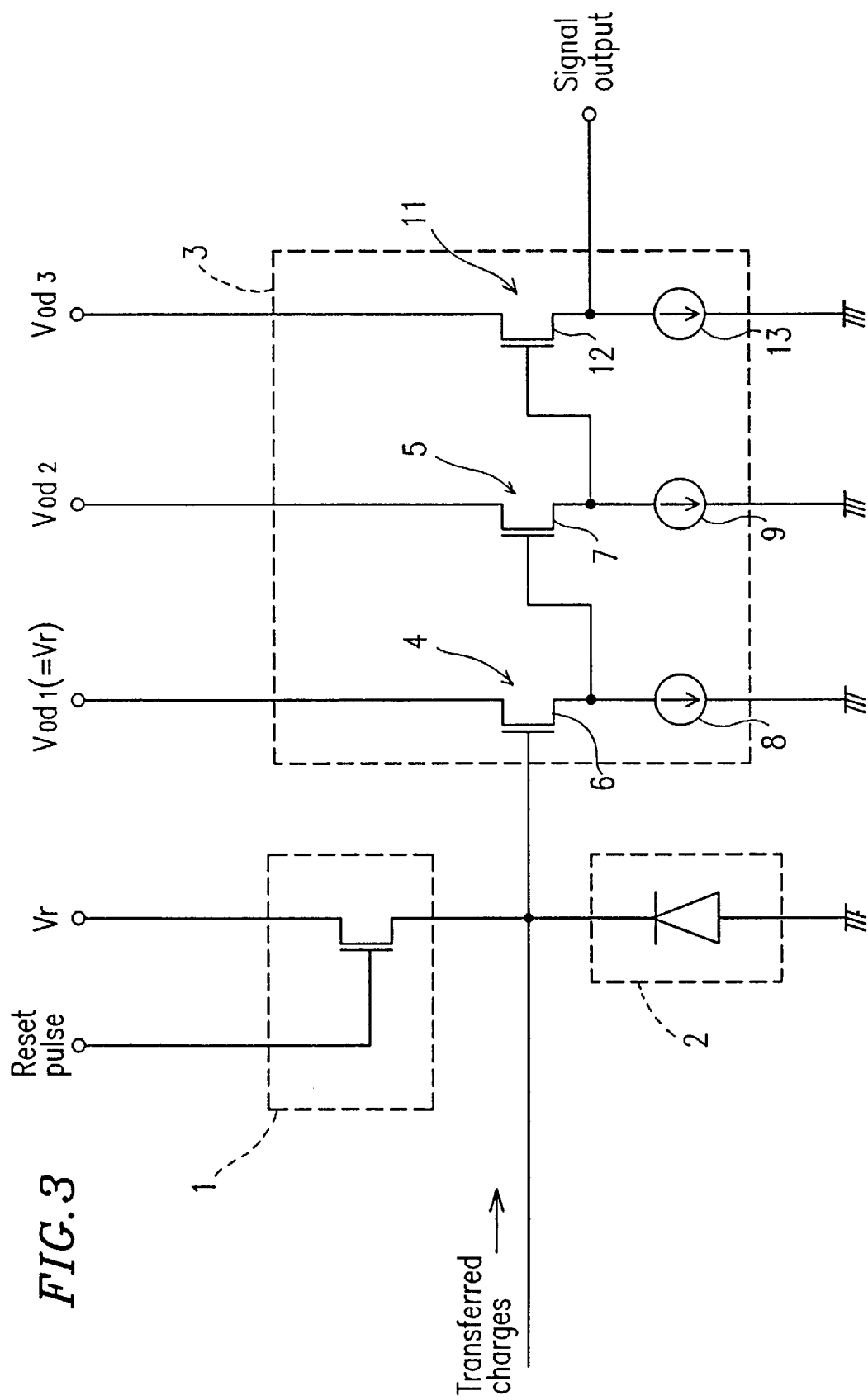
FIG. 3 is a circuit diagram showing a signal output circuit of a CCD solid-state imaging device in a second example according to the present invention.
Figure 4:
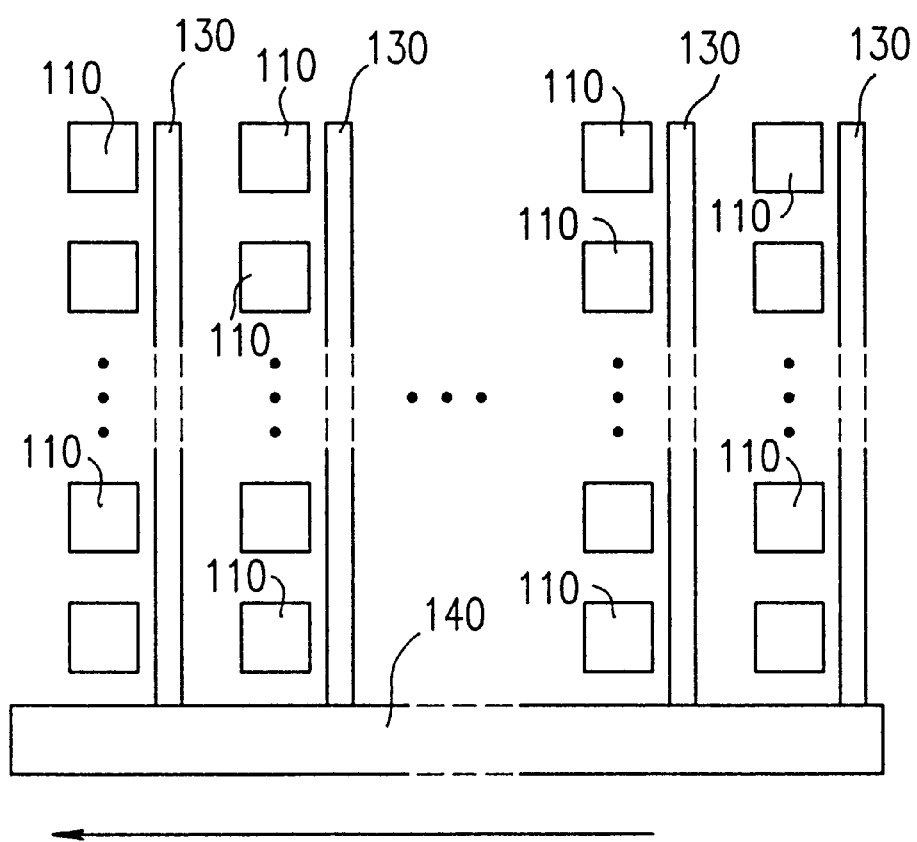
FIG. 4 is a block diagram of a conventional solid-state imaging device.

FIG. 3 is a circuit diagram showing a signal output circuit of Example 2 according to the present invention. Example 2 differs from Example 1 in that a third source follower circuit 11 is further provided for in the amplification circuit 3.

In Example 2, the power supply voltage Vod2 of the second source follower circuit 5 is made as small as possible based on Expression 4 above as in Example 1. A power supply voltage Vod3 of the third source follower circuit 11 is made as small as possible based on Expression 5 below:

$$Vod3 \geq Vg3-Vth3 \quad \text{[Expression 5]}$$

As a result, the power consumption is also reduced in the third source follower circuit 11. Moreover, if the threshold Vth3 of a transistor 12 of the third source follower circuit 11 is increased so as to further reduce the power supply voltage Vod3, the power consumption can be further reduced.

It is apparent that the same effect can be obtained by additionally providing a fourth source follower circuit, a fifth source follower circuit and the like.

As described above, according to the present invention, the power supply voltages of the source follower circuits are lowered as the DC current flowing through each of the source follower circuits increases. Therefore, the power consumption for each additional source follower circuit is reduced.

Moreover, higher thresholds for the transistors of the source follower circuits are used as the DC current flowing through each of the source follower circuits becomes larger. The power supply voltage required to allow the transistors to operate in a saturated range is lowered thereby so as to make it easy to reduce the power supply voltage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state imaging device comprising:

a plurality of photoelectric conversion elements;

a transfer section for transferring charges generated by the photoelectric conversion elements;

a floating diode for converting the charges transferred by the transfer section to voltage signals; and an amplification section including a plurality of source follower circuits, each amplifying the voltage signals generated by the floating diode, wherein different power supply voltages are supplied to the respective source follower circuits, and the power supply voltages are reduced as a DC current flowing through each of the respective source follower circuits increases.

2. A solid-state imaging device according to claim 1, wherein transistors, each constituting one of the source follower circuits, have respectively different thresholds, and the thresholds of the transistors of the source follower circuits are increased as the DC current flowing through each of the source follower circuits increases.

3. A solid-state imaging device comprising:

a plurality of photoelectric conversion elements arranged in a matrix;

a transfer section for transferring charges generated by the photoelectric conversion elements;

a floating diode for converting the charges transferred by the transfer section to voltage signals; and an amplification section for amplifying the voltage signals, including a first source follower circuit through which a first current flows and a second source follower circuit through which a second current flows, the second current having a value higher than a value of the first current, wherein a first voltage for operating the first source follower circuit is applied to the first source follower circuit, and a second voltage for operating the second source follower circuit is applied to the second source follower circuit, and wherein the second voltage is set lower than the first voltage.

4. A solid-state imaging device according to claim 3, wherein the first source follower circuit is formed by a first transistor, and the second source follower circuit is formed by a second transistor, and a threshold of the second transistor is higher than that of the first transistor.

5. A solid-state imaging device according to claim 3, wherein the amplification section further includes a third source follower circuit through which a third current flows, the third current being higher than the second current flowing through the second source follower circuit, and a voltage for allowing the third source follower circuit to operate, which is applied to the third source follower circuit, and is set lower than the second voltage applied to the second source follower circuit.

6. A solid-state imaging device according to claim 5, wherein the first source follower circuit is formed by a first transistor, the second source follower circuit is formed by a second transistor, and the third source follower circuit is formed by a third transistor, and wherein a threshold of the third transistor is higher than that of the second transistor, and a threshold of the second transistor is higher than that of the first transistor.

7. A solid-state imaging device according to claim 3, wherein the second voltage applied to the second source follower circuit is lower than 15 V.

8. A method for driving a solid-state imaging device comprising:

a plurality of photoelectric conversion elements arranged in a matrix;

a transfer section for transferring charges generated by the photoelectric conversion elements;

a floating diode for converting the charges transferred by the transfer section to voltage signals; and an amplification section for amplifying the voltage signals, including a first source follower circuit through which a first current flows and a second source follower circuit through which a second current flows, the second current having a value higher than a value of the first current, the method including the steps of:

applying a first voltage to the first source follower circuit for allowing the first source follower circuit to operate, and applying a second voltage to the second source follower circuit for operating the second source follower circuit, wherein the second voltage is set so as to be lower than the first voltage.

9. A method for driving a solid-state imaging device according to claim 8, wherein the second voltage applied to the second source follower circuit is lower than 15 V.

* * * * *